(12) United States Patent
Armangau et al.

(10) Patent No.: US 10,372,687 B1
(45) Date of Patent: Aug. 6, 2019

(54) SPEEDING DE-DUPLICATION USING A TEMPORAL DIGEST CACHE

(71) Applicant: EMC IP Holding Company LLC, Hopkinton, MA (US)

(72) Inventors: Philippe Armangau, Acton, MA (US); Christopher A. Seibel, Walpole, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 63 days.

(21) Appl. No.: 15/668,388

(22) Filed: Aug. 3, 2017

(51) Int. Cl.
| | | |
|---|---|---|
| G06F 16/00 | (2019.01) | |
| G06F 16/182 | (2019.01) | |
| H04L 29/08 | (2006.01) | |
| G06F 16/178 | (2019.01) | |
| G06F 16/27 | (2019.01) | |
| G06F 16/174 | (2019.01) | |

(52) U.S. Cl.
CPC ........ *G06F 16/1844* (2019.01); *G06F 16/178* (2019.01); *G06F 16/1756* (2019.01); *G06F 16/273* (2019.01); *H04L 67/1097* (2013.01)

(58) Field of Classification Search
CPC .................................................. G06F 16/1844
USPC .......................... 707/634, 747, 749; 711/129
See application file for complete search history.

(56) References Cited

U.S. PATENT DOCUMENTS

| | | | |
|---|---|---|---|
| 9,043,555 B1 * | 5/2015 | Khona | G06F 3/0683 711/118 |
| 9,122,712 B1 | 9/2015 | Bono et al. | |
| 9,727,479 B1 | 8/2017 | Armangau et al. | |
| 9,779,023 B1 | 10/2017 | Armangau et al. | |
| 9,880,743 B1 | 1/2018 | Armangau et al. | |
| 9,880,928 B1 | 1/2018 | Bono et al. | |
| 9,985,649 B1 | 5/2018 | Bassov et al. | |
| 2012/0023070 A1 * | 1/2012 | Prahlad | G06F 11/1453 707/652 |
| 2012/0166448 A1 * | 6/2012 | Li | G06F 16/137 707/747 |

OTHER PUBLICATIONS

Armangau, et al.; "Overwriting Compressed Data Extents," U.S. Appl. No. 15/499,206, filed Apr. 27, 2017.
Dalmatov; "Maintaining a Single Copy of Data Within a Read Cache," U.S. Appl. No. 16/066,498, filed Jun. 27, 2018.
Armangau, et al.; "Inline Deduplication of Compressed Data," U.S. Appl. No. 14/980,944, filed Dec. 28, 2015.

(Continued)

*Primary Examiner* — Chelcie L Daye
(74) *Attorney, Agent, or Firm* — BainwoodHuang

(57) ABSTRACT

Embodiments are directed to techniques for implementing a deduplication system that minimizes disk accesses to an on-disk digest log when deduplicating consecutively-stored data. These techniques for performing deduplication utilize an in-memory temporal digest cache. When the on-disk digest log is accessed for a set of data and a match is found, the temporal digest cache is written with digests not only for the set of data but also for other data stored in a temporal relationship with the set of data. This temporal digest cache allows subsequent deduplication of temporally-related data to proceed faster without needing to repeatedly access the digest log on disk.

20 Claims, 5 Drawing Sheets

(56) References Cited

OTHER PUBLICATIONS

Usvyatsky, et al.; "Techniques for De-Duplicating Data Storage Systems Using a Segmented Index," U.S. Appl. No. 15/394,376, filed Dec. 29, 2016.
Bono, et al.; "Selective Application of Block Virtualization Structures in a File System," U.S. Appl. No. 14/577,387, filed Dec. 19, 2014.
Armangau, et al.; "Managing File System Metadata Using Persistent Cache," U.S. Appl. No. 15/669,364, filed Aug. 4, 2017.
Si, et al.; "Inline Compression With Small-Write Compression Avoidance," U.S. Appl. No. 15/662,676, filed Jul. 28, 2017.
Si, et al.; "Write Tagging for Selective Avoidance of Inline Compression," U.S. Appl. No. 15/499,467, filed Apr. 27, 2017.
Bassov, et al.; "Compressing Data in Line Using Weighted Compression Budgets," U.S. Appl. No. 15/392,639, filed Dec. 28, 2016.
Usvyatsky, et al.; "Performing Reconciliation on a Segmented De-Duplication Index to Reference Just One of a First Copy and a Second Copy of a Particular Data Block," U.S. Appl. No. 15/664,185, filed Jul. 31, 2017.
Hu, et al.; "Performing Block Deduplication Using Block Sequence Classifications," U.S. Appl. No. 14/671,017, filed Mar. 27, 2015.
Armangau, et al.; "Content-Based Caching Using Digests," U.S. Appl. No. 15/668,307, filed Aug. 3, 2017.

\* cited by examiner

SPEEDING DE-DUPLICATION USING A TEMPORAL DIGEST CACHE

BACKGROUND

A data storage system is an arrangement of hardware and software that typically includes one or more storage processors coupled to an array of non-volatile data storage devices, such as magnetic disk drives, electronic flash drives, and/or optical drives. The storage processors service host input/output (I/O) operations received from host machines. The received I/O operations specify storage objects (e.g. logical disks or "LUNs") that are to be written to, read from, created, or deleted. The storage processors run software that manages incoming I/O operations and that performs various data processing tasks to organize and secure the host data received from the host machines and stored on the non-volatile data storage devices Data storage systems commonly arrange data in structures known as file systems. Such file systems include both data and metadata. The metadata organizes the file data on disk, such that each file's data can be located, placed in proper sequence, and kept separate from other files' data.

Some file systems employ deduplication. To perform deduplication, a program searches a file system for data blocks having identical values. The program then replaces duplicate blocks with pointers to a single retained copy. Deduplication can save considerable space in file systems that store multiple copies of the same data.

SUMMARY

Conventional approaches to deduplication repeatedly read data from disk, compute digests, search for duplicates, and reconfigure metadata when duplicates are found. This process may involve keeping a digest log that maps all digests previously computed with respective metadata structures used to keep track of the deduplication. Since the number of unique blocks on a data storage system is typically very large, this digest log is stored on disk. Unfortunately, such activity can result in large numbers of disk accesses, which can interfere with more critical data storage functions, especially when a data storage system is busy servicing host applications. For example, every time a new block is deduplicated, the on-disk digest log must be searched for the appropriate metadata structure even if that metadata structure was just accessed recently, as is likely to be the case when reading consecutively-stored data.

Thus, it would be desirable to implement a deduplication system that minimizes disk accesses to the on-disk digest log when deduplicating consecutively-stored data. In contrast with the above-described prior approach, improved techniques for performing deduplication utilize an in-memory temporal digest cache. When the on-disk digest log is accessed for a set of data and a match is found, the temporal digest cache is written with digests not only for the set of data but also for other data stored in a temporal relationship with the set of data. This temporal digest cache allows subsequent deduplication of temporally-related data to proceed faster without needing to repeatedly access the digest log on disk.

In one embodiment, a method of performing deduplication in a filesystem is performed by a computing device. The method includes (a) providing a plurality of mapping structures, each mapping structure having a set of entries associating one or more logical addresses with respective digests, each digest providing a hash value of data stored at a respective logical address, the set of entries reflecting a temporal pattern of writes, (b) accessing a set of mapping pointers from a file pointer structure in the filesystem, each mapping pointer mapping data provided at a respective logical address of a file defined by the file pointer structure, (c) following a mapping pointer of the set of mapping pointers from the file pointer structure to a first mapping structure to identify a digest that corresponds to a logical address mapped by the mapping pointer, (d) performing a lookup for the digest in a persistent digest log in persistent storage, and (e) in response to the digest being found in the persistent digest log: (1) identifying a second mapping structure that the persistent digest log associates with the digest, (2) changing the mapping pointer to point to the identified second mapping structure, (3) accessing the second mapping structure, and (4) loading multiple digests that the accessed second mapping structure stores into a temporal digest cache within memory, the temporal digest cache thereby storing digests of data blocks that were previously written in a temporal pattern and being likely to again be read in a same temporal pattern, enabling the temporal digest cache to provide information identifying the second mapping structure as associated with other digests while avoiding accessing the persistent digest log in persistent storage in response to subsequent lookups. An apparatus, system, and computer program product for performing a similar method are also provided.

The foregoing summary is presented for illustrative purposes to assist the reader in readily grasping example features presented herein. However, the foregoing summary is not intended to set forth required elements or to limit embodiments hereof in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

DETAILED DESCRIPTION OF THE INVENTION

Embodiments are directed to techniques for implementing a deduplication system that minimizes disk accesses to the on-disk digest log when deduplicating consecutively-stored data. In contrast with prior approaches, improved techniques for performing deduplication utilize an in-memory temporal digest cache. When the on-disk digest log is accessed for a set of data and a match is found, the temporal digest cache is written with digests not only for the set of data but also for other data stored in a temporal relationship with the set of data. This temporal digest cache allows subsequent deduplication of temporally-related data to proceed faster without needing to repeatedly access the digest log on disk.

Figure 1:
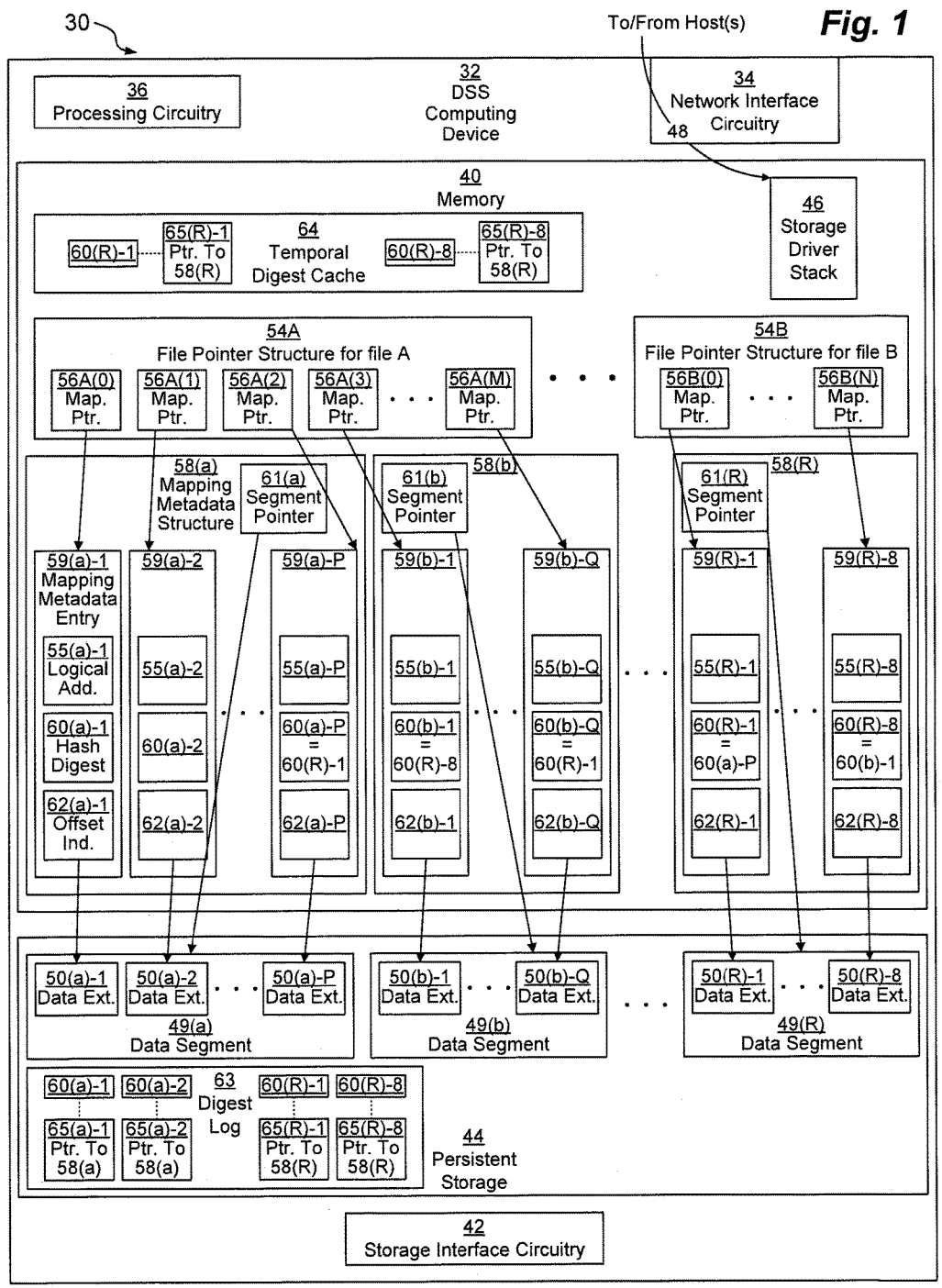
FIG. 1 is a block diagram depicting an example system and apparatus for use in connection with various embodiments.

FIG. 1 depicts an example environment 30 including a computing device 32 serving as a data storage system (DSS). DSS computing device 32 may be any kind of computing device, such as, for example, a personal computer, workstation, server computer, enterprise server, DSS rack server, laptop computer, tablet computes, smart phone, mobile computer, etc. In an example, computing device 32 is a DSS rack server.

DSS computing device 32 includes network interface circuitry 34, processing circuitry 36, memory 40, storage interface circuitry 42, and persistent data storage 44. DSS computing device 32 may also include other components as are well-known in the art, including interconnection circuitry.

Network interface circuitry 34 may include one or more Ethernet cards, cellular modems, Fibre Channel (FC) adapters, Wireless Fidelity (Wi-Fi) wireless networking adapters, and/or other devices for connecting to a network (not depicted). Network interface circuitry 34 allows the DSS computing device 32 to communicate with one or more host devices (not depicted) capable of sending data storage commands to the DSS computing device 32 over the network for fulfillment.

Processing circuitry 36 may be any kind of processor or set of processors configured to perform operations, such as, for example, a microprocessor, a multi-core microprocessor, a digital signal processor, a system on a chip, a collection of electronic circuits, a similar kind of controller, or any combination of the above.

In some embodiments, DSS computing device 32 may be built as a set of two or more storage processors (SPs, not depicted) each mounted on a separate board, each SP having its own network interface circuitry 34, processing circuitry 36, memory 40, and storage interface circuitry 42, but sharing the storage 44 between them. In such embodiments, a high-speed inter-SP bus may connect the SPs. There may be more than one SP installed in DSS computing device 32 for redundancy and performance reasons. In these embodiments, each SP may be considered independently for purposes of this disclosure.

Persistent storage 44 may include any kind of persistent storage devices, such as, for example, hard disk drives, solid-state storage devices (SSDs), flash drives, etc. Storage interface circuitry 42 controls and provides access to persistent storage 44. Storage interface circuitry 42 may include, for example, SCSI, SAS, ATA, SATA, FC, M.2, and/or other similar controllers and ports.

Memory 40 may be any kind of digital system memory, such as, for example, random access memory (RAM). Memory 40 stores an operating system (OS, not depicted) in operation (e.g., a Linux, UNIX, Windows, MacOS, or similar operating system). Memory 40 also stores a storage driver stack 46 (which may include several different storage-related drivers, not depicted, that are arranged in a stack configuration) which executes on processing circuitry 36 to fulfill data storage requests from hosts. Memory 40 also includes a temporal digest cache 64 as well as various other data structures used by the OS, storage driver stack 46, temporal digest cache 64, and various other applications (not depicted). This data includes file pointer structures 54 and mapping metadata structures 58, for example.

In some embodiments, memory 40 may also include a persistent storage portion (not depicted). Persistent storage portion of memory 40 may be made up of one or more persistent storage devices, such as, for example, disks. Persistent storage portion of memory 40 or persistent storage 44 is configured to store programs and data even while the DSS computing device 32 is powered off. The OS, applications, storage driver stack 46, file pointer structures 54, and mapping metadata 58 are typically stored in this persistent storage portion of memory 40 or on persistent storage 44 so that they may be loaded into a system portion of memory 40 from this persistent storage portion of memory 40 or persistent storage 44 upon a system restart or as needed. Storage driver stack 46, when stored in non-transient form either in the volatile portion of memory 40 or on persistent storage drives 44 or in persistent portion of memory 40, forms a computer program product. The processing circuitry 36 running one or more applications and/or storage driver stack 46 thus forms a specialized circuit constructed and arranged to carry out the various processes described herein.

It should be understood that access to persistent storage 44 is typically slower than access to memory 40 (excluding the persistent storage portion of memory 40), typically by an order of magnitude or more.

In operation, a host sends data storage requests 48 to storage driver stack 46, which processes these commands. A data storage request 48 may be of various types, includes READ and WRITE requests, for example. In some examples, data storage requests 48 are file-based requests aimed at logical addresses within files (not depicted) of filesystems (not depicted) that are stored on logical disks (LUNs, not depicted) that are backed by persistent storage 44 as is well-known in the art. In other examples, data storage requests 48 are block-based requests aimed at offsets within particular LUNs. In such cases, the storage driver stack 46 may translate block-based requests into file-based requests directed to a file or files within an internal file system. Storage driver stack 46 fulfills the storage requests 48 by transforming these storage requests into low-level data storage requests aimed at particular addresses within the persistent storage 44, executing these low-level storage requests either via the storage interface circuitry 42 and the persistent storage or via an in-memory cache.

When a data storage request 48 is a WRITE request to write data to a file (or another similar structure) that is mapped by a file pointer structure 54 (such as an inode pointer structure made up of an inode and, if necessary, a set of indirect blocks) containing a set of mapping pointers 56 to locate the data for the file, storage driver stack 46 accesses a particular mapping pointer 56 based on the requested address within the file. The mapping pointer 56 points to a mapping metadata entry 59, such as within an extent list, within a mapping metadata structure 58, which may include a virtual block map (VBM), of the DSS computing device 32. Each mapping metadata structure 58 includes a segment pointer 61 that points to a data segment 49 in persistent storage 44. A data segment 49 is a group of concatenated data blocks (not depicted in FIG. 1). In one embodiment, each data segment 49 includes eight data blocks. Each metadata entry 59 includes an offset indication 62 that indicates where a data extent 50 (that stores data of the file) is stored within the data segment 49. In some embodiments, offset indication 62 may be implicit in the arrangement of various data structures; see below in connection with FIGS. 2 and 3. Data extents 50 may either be compressed or uncompressed. When uncompressed, data extents 50 are blocks (e.g., 512 bytes, 4 kilobytes, 8 kilobytes, etc.) of the persistent storage 44 that store a block of data logically addressed by a mapping pointer 56. When uncompressed, data extents 50 are compressed to be smaller than a block, such that they store compressed data that when decompressed is logically addressed by a mapping pointer 56.

Additional information about extent lists and VBMs may be found in co-pending U.S. patent application Ser. No. 15/499,206, filed Apr. 27, 2017, the contents and teachings of which are incorporated herein by this reference.

Each mapping metadata entry 59 also stores a hash digest 60 that represents the data stored within its respective data extent 50. Hash digest 60 may be, for example, a value that was generated by applying a cryptographic hashing algorithm to the data stored within the extent. In an example, the hashing algorithm is SHA-2, although this is not required, as other algorithms may also be used, such as SHA-0, SHA-1, SHA-3, and MD5. Such algorithms may provide bit-depths such as 128 bits, 160 bits, 172 bits, 224 bits, 256 bits, 384 bits, and 512 bits, for example). Preferably an advanced hashing algorithm with a high bit-depth is used to ensure a low probability of hash collisions between different data blocks, such as fewer than one collision in $2^{80}$ or $2^{128}$, for example Hash digests 60 are used to implement a data de-duplication feature. Thus, several different mapping pointers 56 located within a single file pointer structure 54 (for a single file) or within different file pointer structures 54 (for more than one file) may all point to the same mapping metadata entry 59. This allows data portions within a single file or within several different files that all store identical content to be backed by only one data extent 50 on persistent storage 44, since they all have identical data and thus produce identical hash digests 60.

When a data storage request 48 is a WRITE to a particular file, such as file A, a particular mapping pointer 56A(x) within a file pointer structure 54A for file A is accessed to logically map the data being written to a particular block (i.e., block number x) to a logical location within file A. If the WRITE is to a block within file A that was previously empty, then the particular mapping pointer 56A(x) is set to point to a new mapping metadata entry 59 within a mapping metadata structure 58. For example, when data is first written to the first logical block of file A, mapping pointer 56A(0) is set to point to mapping metadata entry 59(a)-1 within mapping metadata structure 58(a). Segment pointer 61(a) indicates that data associated with this mapping metadata structure 58(a) is stored within segment 49(a) in persistent storage 44. Offset indicator 62(a)-1 indicates that the data for that mapping metadata entry 59(a)-1 is stored within that data segment 49(a) at data extent 50(a)-1. Mapping metadata entry 59(a)-1 also stores a logical address 55(a)-1 of the data block within either file A or within the filesystem within which file A is stored (i.e., a block number within a volume on which the filesystem is housed). Mapping metadata entry 59(a)-1 also stores hash digest 60(a)-1 of the contents of the data stored in data extent 50(a)-1.

As depicted, in addition to mapping pointer 56A(0) pointing to mapping metadata entry 59(a)-1 which indicates that the data is stored in extent 50(a)-1 in persistent storage 44, additional mapping pointers 56A of file A are also shown. As depicted, file A has M+1 logical blocks, mapped by mapping pointers 56A(0), 56A(1), 56A(2), 56A(3), . . . , 56A(M). Mapping pointer 56A(1) points to mapping metadata entry 59(a)-2 which indicates that the data is stored in extent 50(a)-2 in persistent storage 44. Mapping pointer 56A(2) points to mapping metadata entry 59(a)-P which indicates that the data is stored in extent 50(a)-P in persistent storage 44. Mapping pointer 56A(3) points to mapping metadata entry 59(b)-1 which indicates that the data is stored in extent 50(b)-1 in persistent storage 44. Mapping pointer 56A(M) points to mapping metadata entry 59(b)-Q which indicates that the data is stored in extent 50(b)-Q in persistent storage 44.

WRITE data storage requests 48 may also be directed at file B. These are initially processed so that mapping pointer 56B(0) points to mapping metadata entry 59(R)-1 which indicates that the data is stored in extent 50(R)-1 in persistent storage 44 and mapping pointer 56B(N) points to mapping metadata entry 59(R)-8 which indicates that the data is stored in extent 50(R)-8 in persistent storage 44. As depicted, file B has N+1 logical blocks, mapped by mapping pointers 56B(0), . . . , 56B(N)).

As depicted, data segments 49(a) and 49(b) are both compressed data segments 49, which may hold a variable number of data extents 50 each, while data segment 49(R) is an uncompressed data segment 49 configured to hold a fixed number of data extents 50. In an example embodiment, an uncompressed data extent 50 is 8 kilobytes in length, and an uncompressed data segment 49 is sixty-four kilobytes long, capable of storing exactly 8 uncompressed data extents 50. Thus data segments 49(a) and 49(b) both store more than 8 compressed data extents 50 (i.e., P,Q>8). Each mapping metadata structure 58 contains exactly as many mapping metadata entries 59 as its corresponding data segment 49 contains data extents 50.

It should be noted that, as depicted, hash digest 60(b)-1 is equal to hash digest 60(R)-8, hash digest 60(b)-Q is equal to hash digest 60(R)-1, and hash digest 60(a)-P is also equal to hash digest 60(R)-1. Thus, files A and B are suitable candidates for deduplication. Thus, at some point, storage driver stack 46 will perform a deduplication process to clear space. In some embodiments, this deduplication is performed as a background process.

In example operation, the deduplication process may first deduplicate file B (prior to deduplicating file A in this example). Thus, it begins at mapping pointer 56B(0) and follows it to mapping metadata entry 59(R)-1. It then reads hash digest 60(R)-1 and checks a temporal digest cache 64 within memory 40 for that hash digest 60(R)-1. Initially, hash digest 60(R)-1 is not found in temporal digest cache 64, so it proceeds to also check a digest log 63 in persistent storage 44 for that hash digest 60(R)-1. Initially, hash digest 60(R)-1 is not found in digest log 63 either. Therefore, the deduplication process adds hash digest 60(R)-1 to digest log 63 as an index and associates it with a pointer 65(R)-1 to mapping metadata structure 58(R), indicating that the hash digest 60(R)-1 may be found within mapping metadata structure 58(R). In some embodiments, pointer 65(R)-1 is more precise, pointing directly to mapping metadata entry 59(R)-1.

Deduplication then proceeds through file pointer structure 54B, ending with mapping pointer 56B(N). It follows mapping pointer 56B(N) to mapping metadata entry 59(R)-8. It then reads hash digest 60(R)-8 and checks temporal digest cache 64 within memory 40 for that hash digest 60(R)-8. Initially, hash digest 60(R)-8 is not found in temporal digest cache 64, so it proceeds to also check digest log 63 in persistent storage 44 for that hash digest 60(R)-8. Initially, hash digest 60(R)-8 is not found in digest log 63 either. Therefore, the deduplication process adds hash digest 60(R)-8 to digest log 63 as an index and associates it with a pointer 65(R)-8 to mapping metadata structure 58(R), indicating that the hash digest 60(R)-8 may be found within mapping metadata structure 58(R). In some embodiments, pointer 65(R)-8 is more precise, pointing directly to mapping metadata entry 59(R)-8.

The deduplication process may then proceed to file A. Thus, it begins at mapping pointer 56A(0) and follows it to mapping metadata entry 59(*a*)-1. It then reads hash digest 60(*a*)-1 and checks temporal digest cache 64 within memory 40 for that hash digest 60(*a*)-1. Initially, hash digest 60(*a*)-1 is not found in temporal digest cache 64, so it proceeds to also check a digest log 63 in persistent storage 44 for that hash digest 60(*a*)-1. Initially, hash digest 60(*a*)-1 is not found in digest log 63 either. Therefore, the deduplication process adds hash digest 60(*a*)-1 to digest log 63 as an index and associates it with a pointer 65(*a*)-1 to mapping metadata structure 58(*a*), indicating that the hash digest 60(*a*)-1 may be found within mapping metadata structure 58(*a*). In some embodiments, pointer 65(*a*)-1 is more precise, pointing directly to mapping metadata entry 59(*a*)-1.

The deduplication process then proceeds through file pointer structure 54A, ending with mapping pointer 56A(M). It follows mapping pointer 56A(1) to mapping metadata entry 59(*a*)-2. It then reads hash digest 60(*a*)-2 and checks temporal digest cache 64 within memory 40 for that hash digest 60(*a*)-2. Initially, hash digest 60(*a*)-2 is not found in temporal digest cache 64, so it proceeds to also check digest log 63 in persistent storage 44 for that hash digest 60(*a*)-2. Initially, hash digest 60(*a*)-2 is not found in digest log 63 either. Therefore, the deduplication process adds hash digest 60(*a*)-2 to digest log 63 as an index and associates it with a pointer 65(*a*)-2 to mapping metadata structure 58(*a*), indicating that the hash digest 60(*a*)-2 may be found within mapping metadata structure 58(*a*). In some embodiments, pointer 65(*a*)-2 is more precise, pointing directly to mapping metadata entry 59(*a*)-2.

The deduplication process then follows mapping pointer 56A(2) to mapping metadata entry 59(*a*)-P. It then reads hash digest 60(*a*)-P and checks temporal digest cache 64 within memory 40 for that hash digest 60(*a*)-P. Initially, hash digest 60(*a*)-P is not found in temporal digest cache 64, so it proceeds to also check digest log 63 in persistent storage 44 for that hash digest 60(*a*)-P. However, since hash digest 60(*a*)-P is equal to hash digest 60(R)-1, which is already within the digest log 63, hash digest 60(*a*)-P is found in digest log 63. All entries within the digest log 63 corresponding to metadata mapping structure 58(R) are thus loaded from the digest log 63 into temporal digest cache 64 within memory 40 for future use. Thus, the deduplication process adds hash digest 60(R)-1 to temporal digest cache 64 as an index and associates it with a pointer 65(R)-1 to mapping metadata structure 58(R), indicating that the hash digest 60(R)-1 may be found within mapping metadata structure 58(R). In some embodiments, pointer 65(R)-1 is more precise, pointing directly to mapping metadata entry 59(R)-1. In addition, the deduplication process adds hash digest 60(R)-8 to temporal digest cache 64 as an index and associates it with a pointer 65(R)-8 to mapping metadata structure 58(R), indicating that the hash digest 60(R)-8 may be found within mapping metadata structure 58(R). In some embodiments, pointer 65(R)-8 is more precise, pointing directly to mapping metadata entry 59(R)-8. In addition, mapping pointer 56A(2) is changed (not depicted) to instead point to mapping metadata entry 59(R)-1, and mapping metadata entry 59(*a*)-P and data extent 50(*a*)-P are invalidated.

The deduplication process then follows mapping pointer 56A(3) to mapping metadata entry 59(*b*)-1. It then reads hash digest 60(*b*)-1 and checks temporal digest cache 64 within memory 40 for that hash digest 60(*b*)-1. However, since hash digest 60(*b*)-1 is equal to hash digest 60(R)-8, which is already within the temporal digest cache 64, hash digest 60(*b*)-1 is found in temporal digest cache 64 within memory 40, so the deduplication process is able to immediately access mapping metadata structure 58(R) and determine that hash digest 60(*b*)-1 is equal to hash digest 60(R)-8, allowing the deduplication process to change mapping pointer 56A(3) (change not depicted) to instead point to mapping metadata entry 59(R)-8 and invalidate mapping metadata entry 59(*b*)-1 and data extent 50(*b*)-1, while avoiding a disk access to access the digest log 63.

The deduplication process then follows mapping pointer 56A(M) to mapping metadata entry 59(*b*)-Q. It then reads hash digest 60(*b*)-Q and checks temporal digest cache 64 within memory 40 for that hash digest 60(*b*)-Q. However, since hash digest 60(*b*)-Q is equal to hash digest 60(R)-1, which is already within the temporal digest cache 64, hash digest 60(*b*)-Q is found in temporal digest cache 64 within memory 40, so the deduplication process is able to immediately access mapping metadata structure 58(R) and determine that hash digest 60(*b*)-Q is equal to hash digest 60(R)-1, allowing the deduplication process to change mapping pointer 56A(M) (change not depicted) to instead point to mapping metadata entry 59(R)-1 and invalidate mapping metadata entry 59(*b*)-Q and data extent 50(*b*)-Q, while avoiding a disk access to access the digest log 63. At this point, since all mapping metadata entries 59(*b*) have been invalidated (at least as depicted), mapping metadata structure 58(*b*) and its corresponding data segment 49(*b*) may both be freed for reuse.

It should be understood that, although not depicted, there may be several temporal digest caches 64 within memory 40, separate temporal digest caches 64 being used for separate filesystems.

Figure 2:
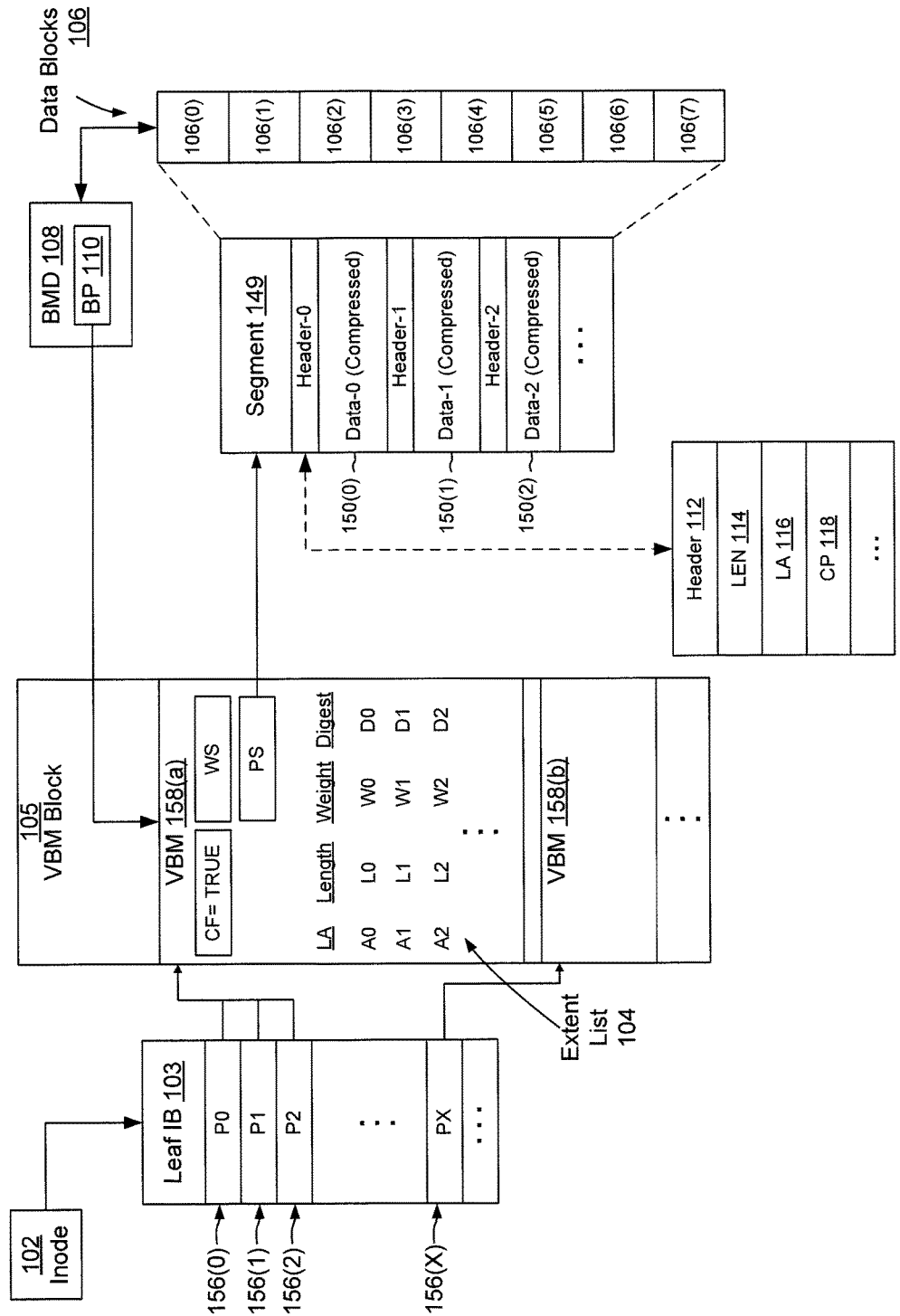
FIGS. 2 and 3 are block diagrams depicting example data structures used in connection with various embodiments.

FIG. 2 shows an example arrangement 100 of filesystem metadata structures in more detail. A filesystem pointer structure 54 includes an inode 102 that points to a leaf indirect block (IB) 103. Leaf IB 103 includes mapping pointers 156, which map logical addresses of the file to corresponding physical addresses (FSBNs) in the file system. For example, mapping pointer 156(0) maps logical address A0, mapping pointer 156(1) maps logical address A1, and mapping pointer 156(2) maps logical address A2. Each logical address (A0, A1, or A2) describes a block-sized increment of storage in the file, even though the underlying data may be compressed to much less than the size of a block. Each of these mapping pointers 156(0), 156(1), 156(2) points to a VBM 158(*a*).

Leaf IB 103 may include additional mapping pointers 156 (e.g., a total of 9 or more, up to a maximum permitted number per segment 49, such as, for example, sixty-three) that all point to VBM 158(*a*) for addressing respective extents of compressed data in segment 149. Leaf IB 103 may also store additional mapping pointers, such as mapping pointer 156(X), which point to other segments 49 via other VBMs such as VBM 158(*b*). Leaf IB 103 may include any number of mapping pointers 156, a typical number being 1024.

In the example shown, mapping pointers 156(0), 156(1), 156(2) in leaf IB 103 all point to compressed VBM 158(*a*). VBM 158(*a*) has a compression flag CF, a weight WS, and a pointer PS. The compression flag CF indicates whether or not VBM 158(*a*) represents compressed data, in this example indicating that it does. The weight WS indicates the number of mapping pointers 156 that point to that VBM 158(*a*), and the pointer PS points to the physical address (FSBN) of the segment 149, which by convention may be selected to be the address of the first data block in segment 149, i.e., data block 106(0). The VBM 158(*a*) also has an extent list 104. Extent list 104 describes the contents of segment 149 and relates, for each extent of compressed data, the logical address (LA) of that item in the file (e.g., A0, A1, or A2), a length (L0, L1, or L2, e.g., in bytes) of that compressed data in the segment 149), a weight (W0, W1, or W2), and a digest 60 (e.g., D0, D1, or D2) of the contents of the extent 150. In an example, the sum of weights of extents in the extent list 104 equals the total weight WS of the VBM 158(a).

Segment 149 is composed of contiguous data blocks 106, i.e., blocks 106(0) through 106(7). For purposes of storing compressed data, boundaries between blocks 106(0) through 106(7) may be ignored and the segment 149 may be treated as one continuous space.

In an example, segment 149 has associated per-block metadata (BMD) 108. By convention, the BMD 108 may be provided for the first block 106(0) in segment 149. The filesystem ensures that BMD 108 has a known location relative to block 106(0) and vice-versa, such that the location of one implies the location of the other. BMD 108 may also store a back-pointer 110 to the VBM 158(a), i.e., to the particular VBM 158(a) that maps the compressed data stored in segment 149.

The detail shown in segment 149 indicates an example layout of compressed extents 150. For instance, Header-0 can be found immediately before compressed Data-0 in extent 150(0). Likewise, Header-1 can be found immediately before compressed Data-1 in extent 150(1). Similarly, Header-2 can be found immediately before compressed Data-2 in extent 150(2).

A compression header 112 is shown for illustration and is intended to be representative of all compression headers in segment 149 (or in any segment 49). In an example, each compression header 112 is a fixed-size data structure that includes multiple data elements, such as the following:

LEN 114: the length of the corresponding extent of compressed data; e.g., in bytes.

LA 116: the logical address (e.g., A0, A1, or A2) of the corresponding extent of compressed data within the file.

CP 118: a compression procedure (or algorithm) used to compress the data, such as LZ-L3, LZH-L4, "Hardware," and so on.

The header 112 may also include additional elements, such as CRC (Cyclic Redundancy Check) and various flags.

VBM 158(a) and at least one other VBM 158(b) are both depicted as being contained within a single VBM block 105, which is a block (e.g., 8 kilobytes in size) that stores both VBMs 158(a), 158(b) together in persistent storage 44. The size of a VBM 158 can vary by embodiment, but, in one embodiment, a VBM block 105 may hold three or four compressed VBMs 158.

Figure 3:
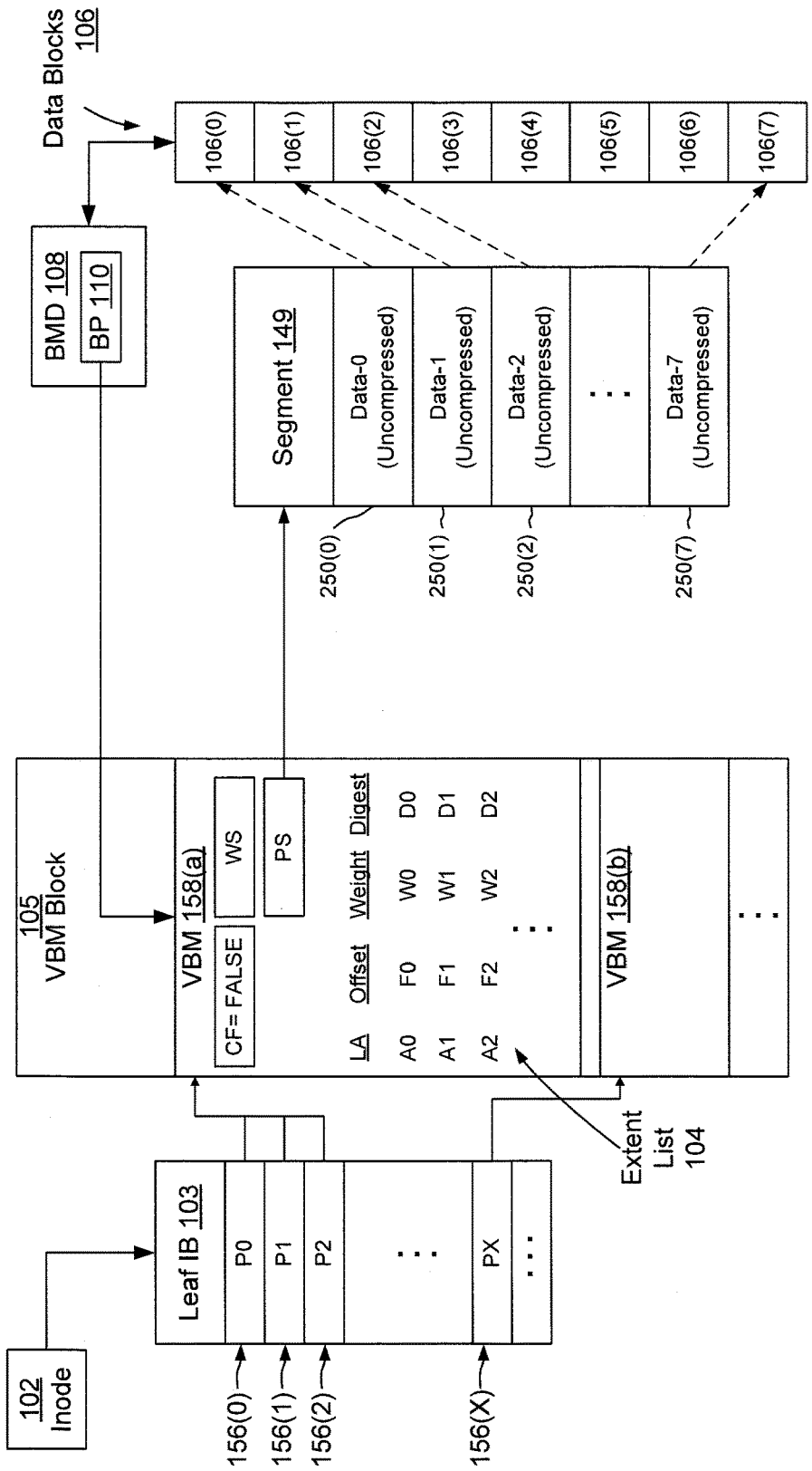

FIG. 3 shows another arrangement 200 similar to FIG. 2, but this time showing an uncompressed example. Thus, in arrangement 200, the compression flag CF is set to false indicating that no compression is used for VBM 158(a). In addition, since all extents are the same length when not compressed, there is no need to separately store the Length of each entry. Rather extent list 104 may instead store a block offset (e.g., F0, F1, or F2) within segment 149. Since each extent 250 is uncompressed, each extent 250 is stored entirely within a physical block 106 of the segment 149. Thus, segment 149 has no headers 112 in arrangement 200, and Data-0 of extent 150(0) is stored in physical block 106(0), Data-1 of extent 150(1) is stored in physical block 106(1), etc.

In one embodiment, a VBM block 105 may hold up to thirty-two uncompressed VBMs 158.

It should be understood that arrangements 100 and 200 may be combined. Thus, a given file may include some mapping pointers 156 to compressed extents 150 in a compressed VBM 158(i) as well as other mapping pointers 156 to uncompressed extents 250 in an uncompressed VBM 158(j).

Figure 4:
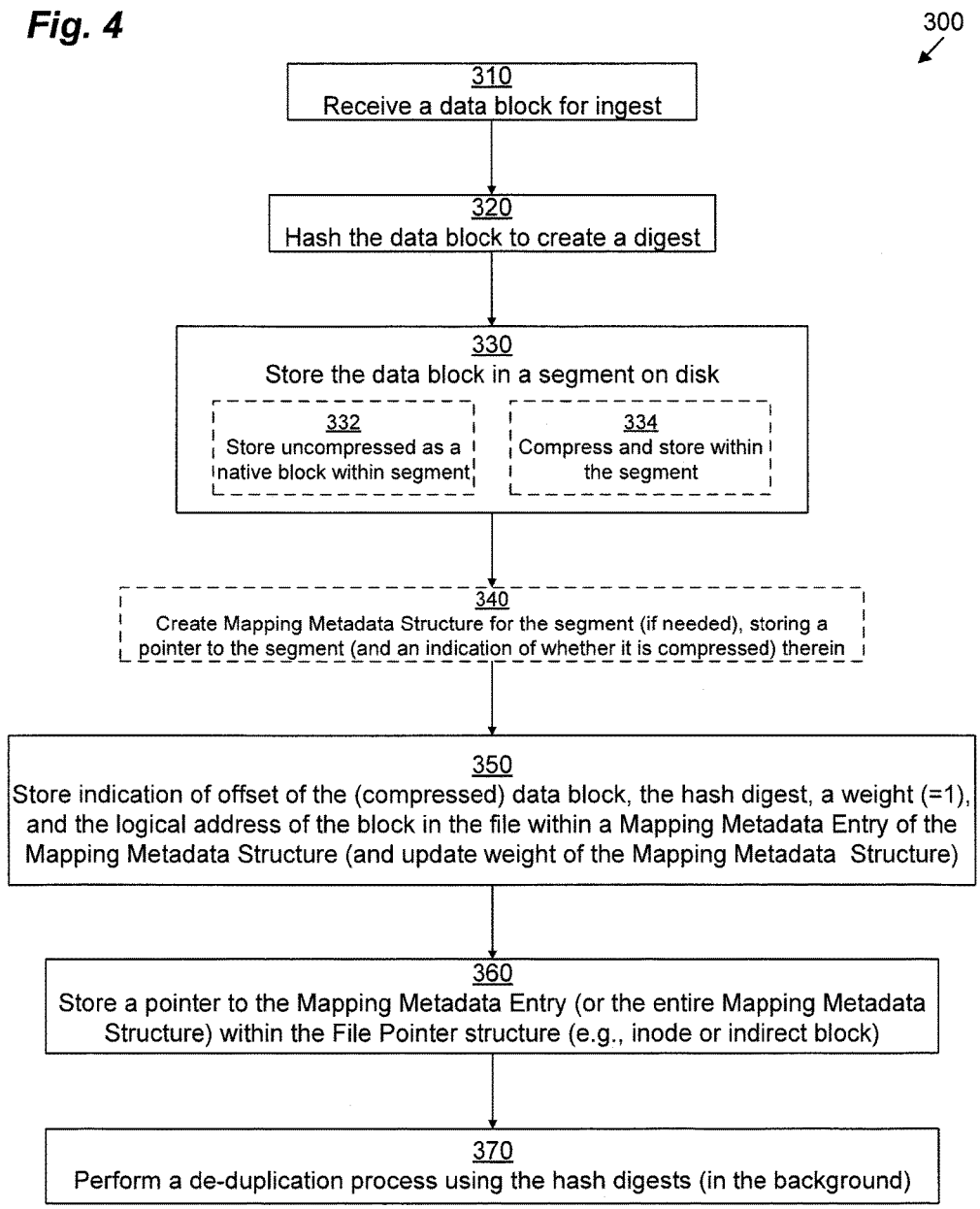
FIG. 4 is a flowchart depicting example methods of various embodiments.

FIG. 4 illustrates an example method 300 performed by storage driver stack 46 for ingesting data in accordance with various embodiments. It should be understood that any time a piece of software (e.g., storage driver stack 46) is described as performing a method, process, step, or function, in actuality what is meant is that a computing device (e.g., DSS computing device 32) on which that piece of software is running performs the method, process, step, or function when executing that piece of software on its processing circuitry 36. It should be understood that one or more of the steps or sub-steps of method 300 may be omitted in some embodiments. Similarly, in some embodiments, one or more steps or sub-steps may be combined together or performed in a different order. Method 300 is performed by DSS computing device 32.

In step 310, storage stack 46 receives a data block for ingest. The data block is meant to be stored in persistent storage 44 and placed within a file of a filesystem. Step 310 may involve a WRITE storage request 48.

In step 320, storage driver stack 46 computes a hash digest 60 of the received data block using a pre-defined hashing algorithm.

In step 330, storage driver stack 46 stores the data block within persistent storage 44 as a data extent 50 within a particular data segment 49. In some arrangements, step 330 is accomplished by performing sub-step 332. In sub-step 332, storage driver stack 46 stores the received data block directly within persistent storage 44 as an uncompressed data extent 250 which takes up one block within an uncompressed data segment 49. Alternatively, in step 334, storage driver stack 46 compresses the received data block and stores the compressed result within persistent storage 44 as a compressed data extent 150, which is smaller than a block, within a compressed segment 49.

In step 340, if a mapping metadata structure 58 (such as a VBM 158) does not already exist for the segment 49 written to in step 330, then storage driver stack 46 creates a mapping metadata structure 58 (such as a VBM 158) for that segment 49. This may include setting the compressed flag CF to TRUE or FALSE (as appropriate) and setting the pointer PS to point to the segment 49 (or its first block 106(0)).

In step 350, storage driver stack 46 stores an indication of the offset of the extent 50 within the segment 49, the computed hash digest 60, an initial weight (e.g., 1) and the logical address LA of the block within the file or filesystem within a mapping metadata entry 59 of the mapping metadata structure 58 that corresponds to the extent 50 written in step 330. In the compressed case, the indication of the offset of the extent 50 within the segment 49 is based on the sum of the lengths of the previous extents in the extent list 104, while in the uncompressed case, the indication of the offset of the extent 50 within the segment 49 may be based on the position within the extent list 104 or based on the stored offset for the entry within the extent list 104. In addition, storage driver stack 46 updates the weight WS by incrementing it by one.

In step 360, storage driver stack 46 stores a mapping pointer 56 within the appropriate location of the file pointer structure 54 (e.g., within inode 102 or leaf IB 104) that points to the mapping metadata entry 59 (or, in some embodiments, to the entire mapping metadata structure 58).

Finally, in step 370, storage driver stack 46 perform a deduplication process based on the hash digests 60 so that mapping pointers 56 that point to mapping data entries 59 with equal hash digests 60 are assigned to both point to the same mapping data entry 59 and redundant data extents 50 in persistent storage 44 are removed (or never written to persistent storage 44 to begin with if they are still in a write cache waiting to be flushed). In some embodiments, this is performed as a background process.

It should be understood that steps 310-360 may be performed repeatedly for different data blocks to be ingested prior to executing step 370.

Figure 5:
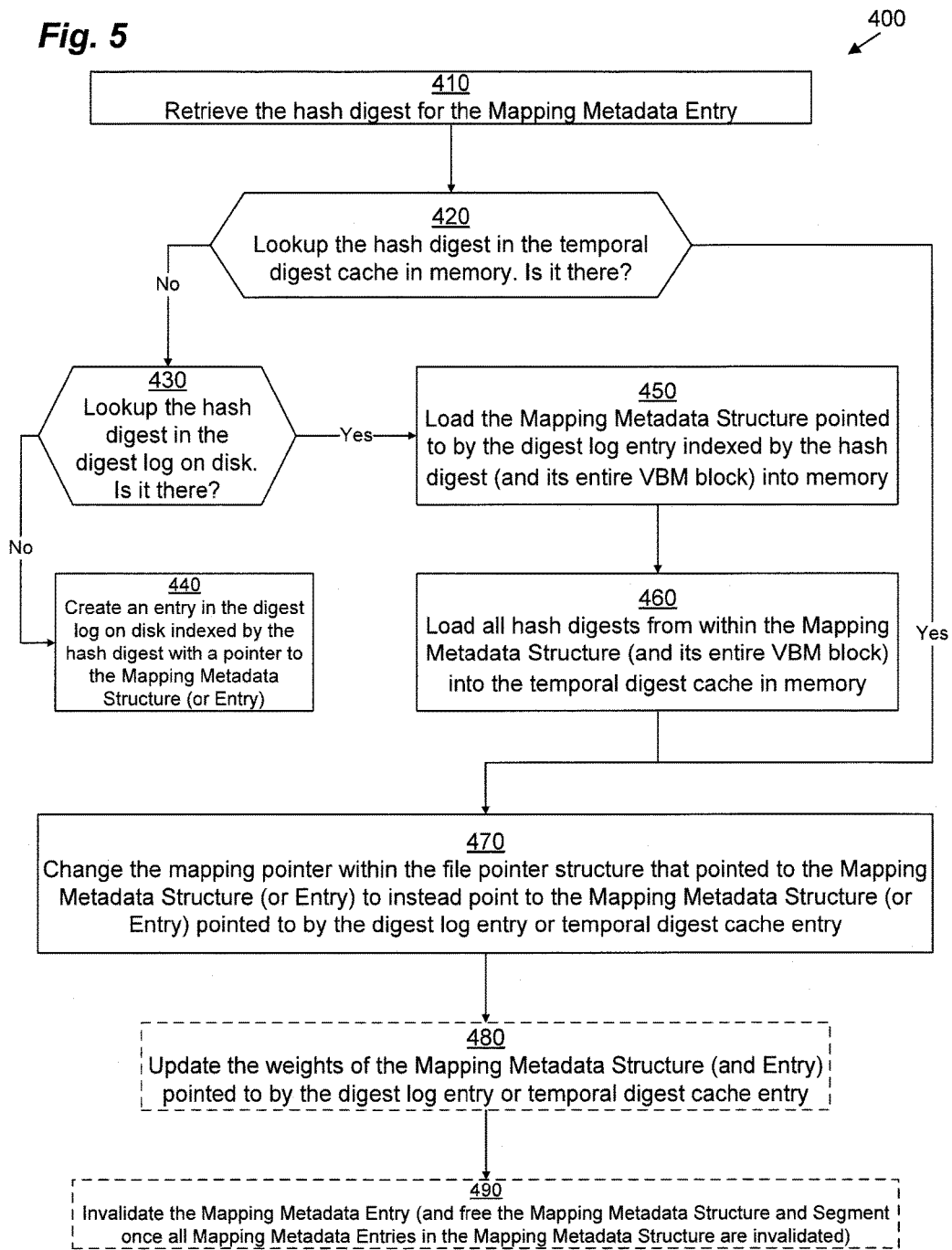
FIG. 5 is a flowchart depicting example methods of various embodiments.

FIG. 5 illustrates an example method 400 performed by storage driver stack 46 for implementing deduplication process 370 in accordance with various embodiments. It should be understood that one or more of the steps or sub-steps of method 400 may be omitted in some embodiments. Similarly, in some embodiments, one or more steps or sub-steps may be combined together or performed in a different order. Method 400 is performed by DSS computing device 32.

Method 400 may be performed for each mapping metadata entry 59 that has not yet had deduplication run. In some embodiments, this may be accomplished by iterating through and following all the mapping pointers 56 in all file pointer structures 54, except for those mapping pointers 56 that have had a flag (not depicted) set indicating that deduplication has already been performed. In other embodiments, this is accomplished by iterating through all mapping metadata structures 58 that have been added or modified since deduplication was last performed.

In step 410, storage driver stack 46 retrieves a hash digest 60(U)-V for a particular mapping metadata entry 59(U)-V in memory 40 that has not yet been deduplicated.

In step 420, storage driver stack 46 looks up the retrieved hash digest 60(U)-V within temporal digest cache 64 in memory 40. If it is found there, then operation proceeds with step 470, otherwise operation proceeds with step 430.

In step 430, storage driver stack 46 looks up the retrieved hash digest 60(U)-V within digest log 63 in persistent storage 44. If it is found there, then operation proceeds with step 450, otherwise operation proceeds with step 440.

In step 440, deduplication has not yet been performed on any block having a hash digest 60 equal to the retrieved hash digest 60(U)-V. Thus, storage driver stack 46 creates a new entry within digest log 63 in persistent storage 44 indexed by the hash digest 60(U)-V with a pointer 65(U)-V that points to the mapping metadata structure 58(U) (or, in some embodiments, more particularly, to the mapping metadata entry 58(U)-V). At this point, method 400 terminates and it may be performed again on a new mapping metadata entry 59 (e.g., mapping metadata entry 59(U)-V+1 or 59(U+1)-1 or another mapping metadata entry 59).

In step 450, storage driver stack 46 loads the mapping metadata structure 58(W) pointed to by the hash digest 60(U)-V index into digest log 63 into a VBM cache (not depicted) within memory 40 if it is not already there. In some embodiments, instead of just loading the mapping metadata structure 58(W), the entire VBM block 105 that it is stored in is also loaded.

In step 460, storage driver stack 46 loads all hash digests 60(W) (excluding invalidated hash digests 60(W)-j whose respective metadata entries 59(W)-j have a weight of zero) from the loaded mapping metadata structure 58(W) into the temporal digest cache 64, thereby creating new entries associating each loaded hash digest 60(W)-j with the pointer 65(W)-j that points to the mapping metadata structure 58(W) (or, in some embodiments, more particularly, to the mapping metadata entry 58(W) j. In some embodiments, instead of just loading the hash digests 60(W) (and creating respective entries) from mapping metadata structure 58(W), hash digests 60 for the entire VBM block 105 are also loaded, each mapped to a pointer to its respective mapping metadata structure 58. In some embodiments, if the temporal digest cache 64 is too full to accommodate all the new entries, old entries that have not been accessed recently may be evicted (e.g., using a least-recently-used list). Even though entries to the temporal digest cache 64 are added a whole VBM 158 or VBM block 105 at a time, they may be evicted individually.

Step 470 and on are performed whether the retrieved hash digest 60(U)-V is found within digest log 63 or temporal digest cache 64. In step 470, storage driver stack 46 changes the mapping pointer 56 that previously pointed to the mapping metadata entry 59(U)-V to instead point to the mapping metadata structure 58(W) or to the mapping metadata entry 59(W)-j therein whose hash digest 60(W)-j is equal to the retrieved hash digest 60(U)-V, depending on the embodiment.

In some embodiments, step 470 is followed by steps 480 and 490. In step 480, storage driver stack 46 updates the weight WS of the mapping metadata structure 58(W) by incrementing it. Storage driver stack 46 may also increment the weight of the mapping metadata entry 59(W)-j therein whose hash digest 60(W)-j is equal to the retrieved hash digest 60(U)-V. Storage driver stack 46 may also decrement the respective weights of the mapping metadata structure 58(U) and the mapping metadata entry 59(U)-V therein.

In step 490, if the weight WS of mapping metadata structure 58(U) has decreased to zero, then that mapping metadata structure 58(U) and its corresponding data segment 49 may be invalidated and freed for reuse. In some embodiments, if the weight of mapping metadata entry 59(U)-V has decreased to zero, then that mapping metadata entry 59(U)-V (and its corresponding data extent 50 in the case of an uncompressed data segment 49) may be invalidated and freed for reuse.

Thus, techniques have been presented for implementing a deduplication system that minimizes disk accesses to the on-disk digest log 63 when deduplicating consecutively-stored data. In contrast with prior approaches, improved techniques for performing deduplication utilize an in-memory temporal digest cache 64. When the on-disk digest log 63 is accessed for a set of data and a match is found, the temporal digest cache 64 is written with digests 60 not only for the set of data but also for other data stored in a temporal relationship with the set of data. This temporal digest cache 64 allows subsequent deduplication of temporally-related data to proceed faster without needing to repeatedly access the digest log 63 on persistent storage 44.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

While various embodiments have been particularly shown and described, it will be understood by those skilled in the art that various changes in form and details may be made therein without departing from the spirit and scope of the appended claims.

For example, although various embodiments have been described as being methods, software embodying these methods is also included. Thus, one embodiment includes a tangible non-transitory computer-readable storage medium (such as, for example, a hard disk, a floppy disk, an optical disk, flash memory, etc.) programmed with instructions, which, when performed by a computer or a set of computers, cause one or more of the methods described in various embodiments to be performed. Another embodiment includes a computer that is programmed to perform one or more of the methods described in various embodiments.

Furthermore, it should be understood that all embodiments which have been described may be combined in all possible combinations with each other, except to the extent that such combinations have been explicitly excluded.

Finally, even if a technique, method, apparatus, or other concept is specifically labeled as "conventional," Applicant makes no admission that such technique, method, apparatus, or other concept is actually prior art under 35 U.S.C. § 102 or 35 U.S.C. § 103, such determination being a legal determination that depends upon many factors, not all of which are known to Applicant at this time.

What is claimed is:

1. A method, performed by a computing device, of performing deduplication in a filesystem hosted on the computing device, the method comprising:
    providing a plurality of mapping structures, each mapping structure having a set of entries associating one or more logical addresses with respective digests, each digest providing a hash value of data stored at a respective logical address, the set of entries reflecting a temporal pattern of writes;
    accessing a set of mapping pointers from a file pointer structure in the filesystem, each mapping pointer mapping data provided at a respective logical address of a file defined by the file pointer structure;
    following a mapping pointer of the set of mapping pointers from the file pointer structure to a first mapping structure to identify a digest that corresponds to a logical address mapped by the mapping pointer;
    performing a lookup for the digest in a persistent digest log in persistent storage; and
    in response to the digest being found in the persistent digest log:
        identifying a second mapping structure that the persistent digest log associates with the digest;
        changing the mapping pointer to point to the identified second mapping structure;
        accessing the second mapping structure; and
        loading multiple digests that the accessed second mapping structure stores into a temporal cache within memory, the temporal cache thereby storing digests of data blocks that were previously written in a temporal pattern and being likely to again be read in a same temporal pattern, enabling the temporal cache to provide information identifying the second mapping structure as associated with other digests while avoiding accessing the persistent digest log in persistent storage in response to subsequent lookups.

2. The method of claim 1 wherein the method further comprises:
    following another mapping pointer of the set of mapping pointers from the file pointer structure to the first mapping structure to identify another digest that corresponds to another logical address mapped by the other mapping pointer;
    performing a lookup for the other digest in the temporal cache within memory without accessing persistent storage; and
    in response to the digest being found in the temporal cache,
        locating that the other digest is included within the second mapping structure and
        changing the other mapping pointer to point to the identified second mapping structure.

3. The method of claim 1 wherein loading multiple digests that the accessed second mapping structure stores into the temporal cache within memory includes loading all valid digests that the accessed second mapping structure stores into the temporal cache.

4. The method of claim 1,
    wherein the second mapping structure is stored within a block of persistent storage as one of a plurality of related mapping structures;
    wherein accessing the second mapping structure includes loading all of the plurality of related mapping structures within the block of persistent storage into memory; and
    wherein loading multiple digests that the accessed second mapping structure stores into the temporal cache within memory includes loading all valid digests that the plurality of related mapping structures store into the temporal cache.

5. The method of claim 4 wherein the method further comprises:
    following another mapping pointer of the set of mapping pointers from the file pointer structure to the first mapping structure to identify another digest that corresponds to another logical address mapped by the other mapping pointer;
    performing a lookup for the other digest in the temporal cache within memory without accessing persistent storage; and
    in response to the digest being found in the temporal cache,
        locating that the other digest is included within the one of the plurality of related mapping structures other than the second mapping structure and
        changing the other mapping pointer to point to the identified one of the plurality of related mapping structures other than the second mapping structure.

6. The method of claim 1 wherein the method further comprises, in response to changing all mapping pointers that previously pointed to the first mapping structure to instead point to other mapping structures:
    freeing space in persistent storage pointed to by the first mapping structure; and
    freeing the first mapping structure for reuse.

7. The method of claim 1 wherein the method is performed as a background process while the computing device continues to provide access to the filesystem.

8. The method of claim 1,
wherein the computing device provides access to a plurality of filesystems; and
wherein the computing device maintains separate temporal caches for different filesystems of the plurality of filesystems.

9. An apparatus for performing deduplication in a filesystem hosted on the apparatus, the apparatus comprising:
persistent storage; and
processing circuitry coupled to memory configured to:
provide a plurality of mapping structures, each mapping structure having a set of entries associating one or more logical addresses with respective digests, each digest providing a hash value of data stored at a respective logical address, the set of entries reflecting a temporal pattern of writes;
access a set of mapping pointers from a file pointer structure in the filesystem, each mapping pointer mapping data provided at a respective logical address of a file defined by the file pointer structure;
follow a mapping pointer of the set of mapping pointers from the file pointer structure to a first mapping structure to identify a digest that corresponds to a logical address mapped by the mapping pointer;
perform a lookup for the digest in a persistent digest log in the persistent storage; and
in response to the digest being found in the persistent digest log:
identify a second mapping structure that the persistent digest log associates with the digest;
change the mapping pointer to point to the identified second mapping structure;
access the second mapping structure; and
load multiple digests that the accessed second mapping structure stores into a temporal cache within memory, the temporal cache thereby storing digests of data blocks that were previously written in a temporal pattern and being likely to again be read in a same temporal pattern, enabling the temporal cache to provide information identifying the second mapping structure as associated with other digests while avoiding accessing the persistent digest log in persistent storage in response to subsequent lookups.

10. The apparatus of claim 9 wherein the processing circuitry coupled to memory is further configured to:
follow another mapping pointer of the set of mapping pointers from the file pointer structure to the first mapping structure to identify another digest that corresponds to another logical address mapped by the other mapping pointer;
perform a lookup for the other digest in the temporal cache within memory without accessing the persistent storage; and
in response to the digest being found in the temporal cache,
locate that the other digest is included within the second mapping structure and
change the other mapping pointer to point to the identified second mapping structure.

11. The apparatus of claim 9 wherein loading multiple digests that the accessed second mapping structure stores into the temporal cache within memory includes loading all valid digests that the accessed second mapping structure stores into the temporal cache.

12. The apparatus of claim 9,
wherein the second mapping structure is stored within a block of the persistent storage as one of a plurality of related mapping structures;
wherein accessing the second mapping structure includes loading all of the plurality of related mapping structures within the block of the persistent storage into memory; and
wherein loading multiple digests that the accessed second mapping structure stores into the temporal cache within memory includes loading all valid digests that the plurality of related mapping structures store into the temporal cache.

13. The apparatus of claim 12 wherein the processing circuitry coupled to memory is further configured to:
follow another mapping pointer of the set of mapping pointers from the file pointer structure to the first mapping structure to identify another digest that corresponds to another logical address mapped by the other mapping pointer;
perform a lookup for the other digest in the temporal cache within memory without accessing the persistent storage; and
in response to the digest being found in the temporal cache,
locate that the other digest is included within the one of the plurality of related mapping structures other than the second mapping structure and
change the other mapping pointer to point to the identified one of the plurality of related mapping structures other than the second mapping structure.

14. The apparatus of claim 9 wherein the processing circuitry coupled to memory is further configured to, in response to changing all mapping pointers that previously pointed to the first mapping structure to instead point to other mapping structures:
free space in the persistent storage pointed to by the first mapping structure; and
free the first mapping structure for reuse.

15. The apparatus of claim 9 wherein the deduplication is performed as a background process while the apparatus continues to provide access to the filesystem.

16. The apparatus of claim 9,
wherein the apparatus provides access to a plurality of filesystems; and
wherein the apparatus maintains separate temporal caches for different filesystems of the plurality of filesystems.

17. A computer program product comprising a non-transitory computer-readable storage medium storing a set of instructions, which, when executed by a computing device, causes the computing device to perform deduplication in a filesystem hosted on the computing device by:
providing a plurality of mapping structures, each mapping structure having a set of entries associating one or more logical addresses with respective digests, each digest providing a hash value of data stored at a respective logical address, the set of entries reflecting a temporal pattern of writes;
accessing a set of mapping pointers from a file pointer structure in the filesystem, each mapping pointer mapping data provided at a respective logical address of a file defined by the file pointer structure;
following a mapping pointer of the set of mapping pointers from the file pointer structure to a first mapping structure to identify a digest that corresponds to a logical address mapped by the mapping pointer;

performing a lookup for the digest in a persistent digest log in persistent storage; and in response to the digest being found in the persistent digest log:

identifying a second mapping structure that the persistent digest log associates with the digest;

changing the mapping pointer to point to the identified second mapping structure;

accessing the second mapping structure; and loading multiple digests that the accessed second mapping structure stores into a temporal cache within memory, the temporal cache thereby storing digests of data blocks that were previously written in a temporal pattern and being likely to again be read in a same temporal pattern, enabling the temporal cache to provide information identifying the second mapping structure as associated with other digests while avoiding accessing the persistent digest log in persistent storage in response to subsequent lookups.

18. The computer program product of claim 17 wherein the instructions, when executed by the computer program product, further cause the computer program product to:

follow another mapping pointer of the set of mapping pointers from the file pointer structure to the first mapping structure to identify another digest that corresponds to another logical address mapped by the other mapping pointer;

perform a lookup for the other digest in the temporal cache within memory without accessing persistent storage; and in response to the digest being found in the temporal cache, locate that the other digest is included within the second mapping structure and change the other mapping pointer to point to the identified second mapping structure.

19. The computer program product of claim 17 wherein loading multiple digests that the accessed second mapping structure stores into the temporal cache within memory includes loading all valid digests that the accessed second mapping structure stores into the temporal cache.

20. The computer program product of claim 17, wherein the second mapping structure is stored within a block of persistent storage as one of a plurality of related mapping structures;

wherein accessing the second mapping structure includes loading all of the plurality of related mapping structures within the block of persistent storage into memory; and wherein loading multiple digests that the accessed second mapping structure stores into the temporal cache within memory includes loading all valid digests that the plurality of related mapping structures store into the temporal cache.

\* \* \* \* \*